(12) United States Patent
Patton et al.

(10) Patent No.: US 12,446,122 B2
(45) Date of Patent: Oct. 14, 2025

(54) SYSTEMS AND METHODS FOR TEMPERATURE PROFILE CONTROL OF MICROWAVE OVEN DEVICES

(71) Applicant: Samsung Electronics Company, Ltd., Gyeonggi-do (KR)

(72) Inventors: Brian R. Patton, San Francisco, CA (US); Pedro Martinez Lopez, Sunnyvale, CA (US); Mohammad J Abu Saude, Sunnyvale, CA (US); Jun Yeon Cho, San Jose, CA (US); Nigel A. Clarke, Mountain View, CA (US); Marc Estruch Tena, San Jose, CA (US); Gustavo A. Guayaquil Sosa, Sunnyvale, CA (US); Cathy Kim, Sunnyvale, CA (US); Bob W. Cheng Lian, Fremont, CA (US); Jacob A. Marks, Stanford, CA (US); Santiago Ortega Avila, Mountain View, CA (US); Ian D. Parker, Santa Barbara, CA (US); Sergio Perdices-Gonzalez, Sunnyvale, CA (US); Ernest R. Post, San Francisco, CA (US); Sajid Sadi, San Jose, CA (US); Forrest G. Tran, Milpitas, CA (US); Kushal Kardam Vyas, Santa Clara, CA (US)

(73) Assignee: Samsung Electronics Co., Ltd., Suwon-Si (KR)

(*) Notice: Subject to any disclaimer, the term of this patent is extended or adjusted under 35 U.S.C. 154(b) by 545 days.

(21) Appl. No.: 17/316,497

(22) Filed: May 10, 2021

(65) Prior Publication Data

US 2022/0377856 A1   Nov. 24, 2022

(51) Int. Cl.
*H05B 6/68* (2006.01)
*H05B 6/64* (2006.01)

(52) U.S. Cl.
CPC .............. *H05B 6/68* (2013.01); *H05B 6/6402* (2013.01); *H05B 6/6482* (2013.01)

(58) Field of Classification Search
CPC ...... H05B 6/68; H05B 6/6402; H05B 6/6482; H05B 6/6447
See application file for complete search history.

(56) References Cited

U.S. PATENT DOCUMENTS 9,414,444 B2 *   8/2016   Libman .................. H05B 6/688
9,807,823 B2 *  10/2017   Einziger .................. H05B 6/68
(Continued)

FOREIGN PATENT DOCUMENTS

CN   106664753   5/2017
CN   109727657   1/2019
(Continued)

OTHER PUBLICATIONS

"Put some swagger on your countertop and let June do the cooking." june; https://juneoven.com/pages/smart-oven.
(Continued)

*Primary Examiner* — Helena Kosanovic
*Assistant Examiner* — Thao Uyen Tran-Le

(57) ABSTRACT

A method by an electromagnetic device includes determining a pattern of electromagnetic energy absorbed by a load disposed inside a cavity into which electromagnetic radiation is directed and generating one or more maps of the pattern of electromagnetic energy absorbed by the load. The one or more maps comprises an indication of a distribution of heating within the load. The method further includes determining, based on the one or more maps, a plurality of sequences of operating parameter combinations configured so as to heat the load via absorption of the electromagnetic radiation in accordance with a target temperature profile with respect to the load. The method thus includes emitting
(Continued)

electromagnetic radiation into the cavity based on the plurality of sequences of operating parameter combinations to achieve the target temperature profile with respect to the load.

20 Claims, 14 Drawing Sheets

(56) References Cited

U.S. PATENT DOCUMENTS

| | | | |
|---|---|---|---|
| 10,223,933 B1* | 3/2019 | Cheng | A47J 36/02 |
| 10,268,919 B1* | 4/2019 | Piekniewski | H04N 9/7973 |
| 10,819,905 B1 | 10/2020 | Liu | |
| 11,774,105 B2 | 10/2023 | Chase | |
| 2009/0321427 A1* | 12/2009 | Hyde | H05B 6/72 |
| | | | 219/702 |
| 2009/0321428 A1 | 12/2009 | Hyde | |
| 2010/0187224 A1 | 7/2010 | Hyde | |
| 2013/0269539 A1 | 10/2013 | Polt | |
| 2013/0306627 A1 | 11/2013 | Libman | |
| 2015/0289324 A1 | 10/2015 | Rober | |
| 2015/0366219 A1* | 12/2015 | Stork genannt Wersborg | |
| | | | G01J 5/0044 |
| | | | 702/136 |
| 2016/0029441 A1* | 1/2016 | Taylor | H05B 6/645 |
| | | | 219/745 |
| 2016/0073453 A1 | 3/2016 | Hyde | |
| 2016/0192446 A1 | 6/2016 | Seddik | |
| 2016/0309548 A1* | 10/2016 | Libman | H05B 6/6455 |
| 2017/0074522 A1 | 3/2017 | Cheng | |
| 2019/0116634 A1 | 4/2019 | Eadan | |
| 2019/0254127 A1* | 8/2019 | Ma | H05B 6/664 |
| 2019/0320507 A1* | 10/2019 | Guatta | H05B 6/645 |
| 2020/0187709 A1 | 6/2020 | Ayre | |
| 2020/0367692 A1 | 11/2020 | Stipe | |
| 2021/0145212 A1* | 5/2021 | Wang | A47J 36/321 |
| 2021/0267027 A1 | 8/2021 | Uno | |
| 2021/0307135 A1 | 9/2021 | Hooker | |
| 2021/0385917 A1 | 12/2021 | Kuchler | |
| 2021/0386239 A1* | 12/2021 | Eiter | G01N 33/02 |
| 2022/0141928 A1 | 5/2022 | Hong | |
| 2022/0264709 A1* | 8/2022 | Zoellner | A23L 5/15 |
| 2023/0269840 A1 | 8/2023 | Martinez Lopez | |

FOREIGN PATENT DOCUMENTS

| | | |
|---|---|---|
| CN | 110298902 A | 10/2019 |
| JP | H06229557 | 8/1994 |
| JP | 2001201057 A | 7/2001 |
| JP | 2001317742 A | 11/2001 |
| JP | 2004095501 A | 3/2004 |
| JP | 3672767 B2 | 7/2005 |
| JP | 2005315487 | 11/2005 |
| JP | 3792495 | 4/2006 |
| JP | 2015220189 | 12/2015 |
| JP | 2016-110750 A | 6/2016 |
| JP | 2019070462 | 5/2019 |
| KR | 19990065353 A | 8/1999 |
| KR | 10-0416286 B1 | 1/2004 |
| KR | 2019-0069624 A | 6/2019 |
| KR | 2021-0029722 A | 3/2021 |

OTHER PUBLICATIONS

"NNLC: Non-Negative Least Chi-square minimization and application to HPGe detectors," by Pierre D'esesquelles et al.; Cornell University, Journey Ref: J.Phys.G36:037001,2009.

"Software-Defined Cooking using a Microwave Oven", by Haojian Jin et al.; Cernegie Mellon University, Pittsburgh, PA, US.

"Solving Least Squares Problems," by Charles L. Lawson et al., Society for Industrial and Applied Mathematics, Philadelphia. Chapter 23 pp. 158-173.

Miele adds electromagnetic waves to Wi-Fi oven for better cooking, Ashlee Clark Thompson, https://www.cnet.com/reviews/miele-dialog-oven-preview/, Aug. 30, 2017.

RF solid-state technology The digital cooking revolution, Goji Food Solutions, http://www.gojifoodsolutions.com/rf-cooking-technology, Downloaded from web Jan. 15, 2021.

Heat MAP Microwave- a NEW invention; Mark Rober https://youtu.be/ptkzzNaZb7U, Feb. 11, 2015.

PCT Search Report and Written Opinion in Application No. PCT/KR2022/006554.

Combustion Inc. Predictive Probe: https://combustion.inc/ , 17 pages, pulled from website Feb. 10, 2022.

Khan, Tareq, "An Intelligent Microwave Oven with Thermal Imaging and Temperature Recommendation Using Deep Learning," Applied System Innovation, 2020 3, 13,doi: 10.3390/asi3010013, Received: Dec. 23, 2019, Accepted Feb. 13, 2020, Published: Feb. 17, 2020, www.mdpi.com/journal/asi, 17 pages, Feb. 17, 2020.

PCT Search Report and Written Opinion in PCT/KR2023/095007, Jun. 14, 2023.

Non-final office action in U.S. Appl. No. 17/680,104, Dec. 5, 2024.

Final office action in U.S. Appl. No. 17/680,104, May 6, 2025.

Non-Final Office Action in U.S. Appl. No. 17/707,561, Dec. 20, 2024.

European Patent Office Extended European Search Report in application No. 23760451.7-1002 / 4388821 PCT/KR2023095007, Nov. 8, 2024.

Final Office Action in U.S. Appl. No. 17/707,561, Mar. 6, 2025.

Notice of Allowance in U.S. Appl. No. 17/707,561, Apr. 25, 2025.

Notice of Allowance in U.S. Appl. No. 17/680,104, Sep. 3, 2025.

* cited by examiner

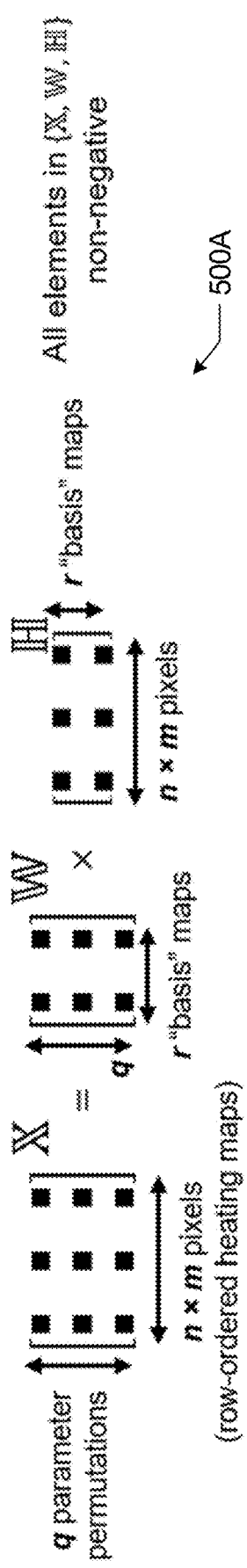
FIG. 5A
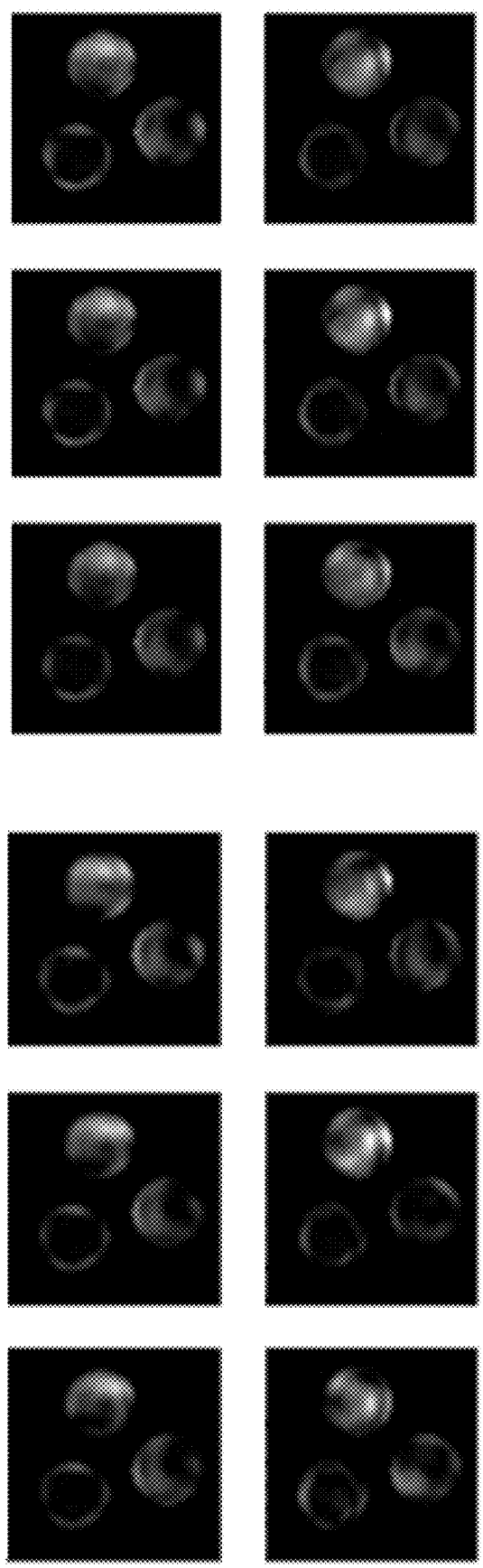
FIG. 5B
FIG. 5C

SYSTEMS AND METHODS FOR TEMPERATURE PROFILE CONTROL OF MICROWAVE OVEN DEVICES

TECHNICAL FIELD

This disclosure relates generally to microwave oven devices, and more particularly to temperature profile control of microwave oven devices.

BACKGROUND

Conventional microwave oven devices typically heat food unevenly, often resulting in unsatisfactory food temperatures (e.g., regions either too hot or too cold), excessive user intervention, potential degradation of the food being heated, minor accidents (e.g., unwanted boiling or spattering due to overheating), slow heating times (e.g., on/off power cycling to even out temperatures), and so forth. Additionally, many conventional microwave ovens may require the user to input a heating time duration in order to achieve a desired food temperature. Such a process may be fraught with uncertainty, and may often be made more complex for users due to the cumbersome user interface options for entering the heating time durations. It may be thus useful to provide techniques to improve microwave oven devices.

BRIEF DESCRIPTION OF THE DRAWINGS

FIGS. 5A, 5B, and 5C illustrate one or more example diagrams depicting techniques for providing a temperature profile based microwave oven device.

DESCRIPTION OF EXAMPLE EMBODIMENTS

The present embodiments are directed toward techniques for providing a temperature profile based microwave oven device. In particular embodiments, an electromagnetic device may measure the pattern of microwave energy absorbed by a load disposed inside a cavity within the electromagnetic device when electromagnetic radiation is directed into the cavity. In particular embodiments, the electromagnetic device may determine a type of load, and using information about its electromagnetic properties may determine the energy deposition based on the determined type of load. In particular embodiments, the electromagnetic device may then generate one or more maps of the energy deposition of the load, in which the one or more maps may include an indication of a microwave energy absorbed by the load. In particular embodiments, the electromagnetic device may then determine, based on the one or more maps of the energy deposition, a number of sequences of operating parameters configured to cause the electromagnetic device to emit electromagnetic radiation in accordance with a target temperature profile with respect to the load.

For example, in particular embodiments, the potentially variable operating parameters comprises one or more of a radiation frequency, a radiation amplitude, a radiation phase, a radiation phase shift, location or orientation of electromagnetically reflecting or refracting elements ("mode stirrers") within the cavity or waveguide, a load rotation, or a load translation. In particular embodiments, the desired sequence of operating parameter combinations may be determined based a weighted sum of different combinations of operating parameters, in which each of the different combinations of operating parameters may correspond to a respective map of load heating within the electromagnetic device. In particular embodiments, the electromagnetic device may then emit electromagnetic radiation toward the load based on the calculated sequence of operating parameters to achieve the target temperature profile with respect to the load. For example, in particular embodiments, emitting the electromagnetic radiation toward the load may include emitting electromagnetic radiation to heat the load in accordance with the target temperature profile. In another example, in particular embodiments, emitting the electromagnetic radiation toward the load may further include varying the plurality of operating parameters and a motion of the load concurrently. In particular embodiments, the electromagnetic device measures the temperature of the load at one or more locations in the load. In this way, the present embodiments may provide a temperature profile based microwave oven device that allows a user to input a desired temperature or desired temperature profile for their food as opposed to a time duration, and automatically apply the heating energy suitable to achieve the desired heating temperature without further user input.

Figure 1:
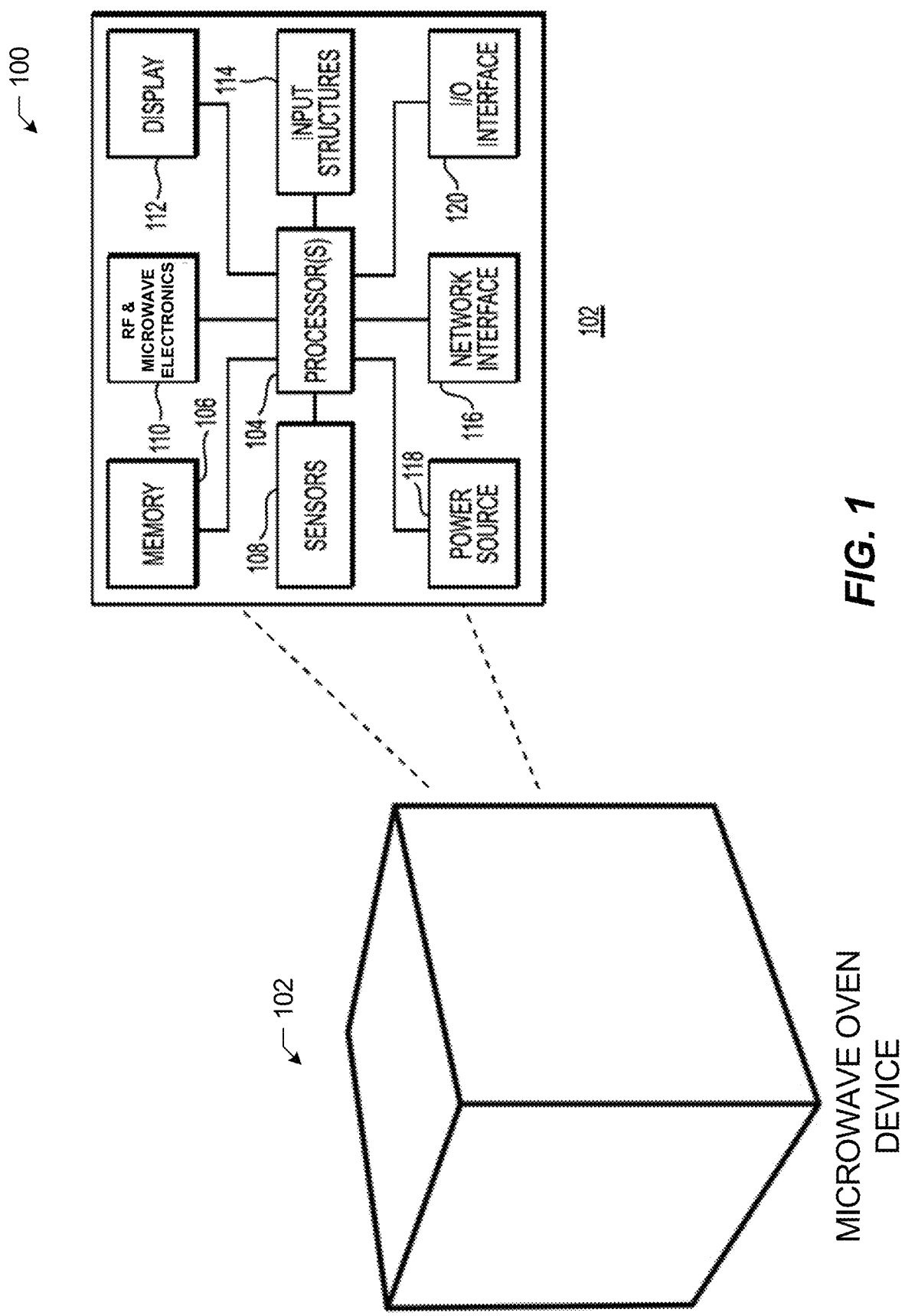
FIG. 1 illustrates an example microwave oven device.

FIG. 1 illustrates an example diagram 100 of a microwave oven device 102, which may include a temperature profile based microwave oven device, in accordance with the presently disclosed embodiments. In particular embodiments, the microwave oven device 102 may include, for example, any of various microwave oven devices 102 that may be suitable for heating or warming food, or otherwise directing electromagnetic energy to one or more loads disposed inside a cavity of the microwave oven device 102. In particular embodiments, as further depicted by FIG. 1, the microwave oven device 102 may include, among other things, one or more processor(s) 104, memory 106, sensors 108, radio frequency (RF) and microwave electronics 110, a display panel 112, input structures 114, network interfaces 116, a power source 118, and an input/output (I/O) interface 120. It should be noted that FIG. 1 is merely one example of a particular implementation and is intended to illustrate the types of components that may be included as part of the microwave oven device 102.

In particular embodiments, the one or more processor(s) 104 may be operably coupled with the memory 106 to perform various algorithms for providing a temperature profile based microwave oven device. Such programs or instructions executed by the processor(s) 104 may be stored in any suitable article of manufacture that includes one or more tangible, computer-readable media at least collectively storing the instructions or routines, such as the memory 106. The memory 106 may include any suitable articles of manufacture for storing data and executable instructions, such as random-access memory (RAM), read-only memory (ROM), rewritable flash memory, hard drives, and so forth.

Also, programs (e.g., an operating system) encoded on such a computer program product may also include instructions that may be executed by the processor(s) 104 to enable the microwave oven device 102 to provide various functionalities.

In particular embodiments, the sensors 108 may include, for example, one or more cameras (e.g., depth cameras), touch sensors, microphones, motion detection sensors, thermal detection sensors, light detection sensors, time of flight (ToF) sensors, ultrasonic sensors, infrared sensors, or other similar sensors that may be utilized to detect the physical state of the load (e.g., its temperature profile) or various user inputs (e.g., user voice inputs, user gesture inputs, user touch inputs, user instrument inputs, user motion inputs, and so forth). The RF and microwave electronics 110 may include, for example, any number of magnetrons, power amplifiers, signal generators, waveguides, antennas, integrated circuits, transistors, solid-state amplifiers, and/or one or more other devices that may be collectively suitable for directing electromagnet energy (e.g., microwave energy) to a load (e.g., food, solids, liquids, and so forth) that may be disposed inside a cavity of the microwave oven device 102. The display panel 112 may include any display architecture (e.g., AMLCD, AMOLED, micro-LED, and so forth), which may provide further means by which users may interact and engage with the microwave oven device 102.

In particular embodiments, the input structures 114 may include any physical structures utilized to control one or more global functions of the microwave oven device 102 (e.g., pressing a button to power "ON" or power "OFF" the microwave oven device 102). The network interface 116 may include, for example, any number of network interfaces suitable for allowing the microwave oven device 102 to access and receive data over one or more cloud-based networks (e.g., a cloud-based service that may service hundreds or thousands of the microwave oven device 102 and the associated users corresponding thereto) and/or distributed networks. The power source 118 may include any suitable source of power, such as a rechargeable lithium polymer (Li-poly) battery and/or an alternating current (AC) power converter that may be utilized to power and/or charge the microwave oven device 102 for operation. Similarly, the I/O interface 120 may be provided to allow the microwave oven device 102 to interface with various other electronic or computing devices, such as one or more auxiliary electronic devices.

In particular embodiments, inhomogeneous heating is an intrinsic property of a microwave cavity due to the standing-wave pattern that is established by the reflective walls. Within a source-free medium such as air or food, the microwaves obey the electromagnetic wave equation:

$$\nabla \times \left(\frac{1}{\mu}\right) \nabla \times E - \omega^2 \epsilon E = 0;$$ (Equation 1)

$$\nabla^2 E + \omega^2 \epsilon \mu E = 0,$$ (Equation 2).

In Equation 1 and Equation 2, E represents the complex vector electric field, μ the complex magnetic permeability of the material, ϵ the complex dielectric permittivity of the material, and ω the angular frequency of the wave. Incident microwaves reflect off the electrically conducting oven walls, setting up a stationary standing wave pattern of constructive and destructive interference. Certain microwave oven devices 102 may operate with frequencies of 2400 megahertz (MHz) to 2500 MHz, resulting in a wavelength of 12 centimeters (cm). An empty commercial microwave oven device will tend to have a semi-regular pattern of standing wave nodes and anti-nodes separated by half this length, or 6 cm. The RF wavelength may be smaller in dielectric materials, such as food. For example, food is heated by absorption of the electric field according to its electric and magnetic properties:

$$\epsilon = \epsilon_0 (\epsilon' + i\, \epsilon'')$$ (Equation 3).

In Equation 3, ϵ' and ϵ'' are real-valued (and generally frequency-dependent) parameters of the food, $\epsilon_0$ is a fundamental physical constant, and $i$ is the imaginary unit. In the absence of magnetic dissipation, the power density P absorbed by the food may be calculated as:

$$P = \tfrac{1}{2}(\sigma + \epsilon_0 \epsilon'' \omega) |E|^2$$ (Equation 4).

In Equation 4, σ is the electrical conductivity. In Equation 4, P is measured in watts per cubic meter. The power deposition in the food is proportional to the squared magnitude of the electric field, which is fundamentally inhomogeneous within the cavity due to the standing-wave pattern. In particular embodiments, inhomogeneity is made worse by the fact that the food fundamentally changes the standing-wave pattern within the cavity, meaning that the heating pattern may generally not be determined a priori. The standing-wave pattern is affected not only by the food dielectric characteristics, but also by its geometry and placement within the cavity. For example, if the load is placed on a rotating turntable within the cavity, the standing-wave pattern throughout the cavity will be modulated as the turntable rotates, and regions of high heating within the food will not remain fixed with respect to either the food or the cavity coordinate system.

In particular embodiments, in conventional microwave oven devices, the microwave energy may be generated by a magnetron (e.g., an analog high-power vacuum tube device that emits radiofrequency waves by resonant oscillation). Though efficient and inexpensive, magnetrons generally have poor frequency and phase control and may not be driven at intermediate powers. The standard approach to power regulation in a commercial microwave oven device is to cycle the magnetron power on and off with variable duty cycle. This relies on thermal diffusion within the food to even out the temperature, but may be an imprecise and slow technique that invariably results in overheating or underheating some regions within the load (e.g., food). A major drawback of this approach is that thermal diffusion in most foods is quite slow. The conductive heat diffusion equation within a substance is parameterized by its density ρ, specific heat $c_p$, and thermal conductivity k:

$$\rho c_p \frac{\partial T}{\partial t} = k \nabla^2 T.$$ (Equation 5)

This diffusion equation (e.g., Equation 5) relates the time derivative of the temperature at every point in the load to its Laplacian (derived from its spatial gradient). The combination $k/\rho c_p$ is the thermal diffusivity α of the substance, with units cm$^2$/sec. The characteristic time $t_{diff}$ for heat to diffuse a length $\ell$ through the material is simplified as:

$$t_{diff} = \ell^2 / 2\alpha$$ (Equation 6).

In particular embodiments, the thermal diffusivity of beef is reported in the literature to be $\alpha_{beef} \approx 0.0013$ cm$^2$/s. If two regions within a plate of beef are separated by 1 cm and heated to different temperatures, it may be deduced that it will take approximately 385 seconds for the temperature to even out. Thus, heat diffusion may be too slow to even out hotspots or cold-spots. For example, as previously determined through a power-cycled microwave heating experiment, the temperature of the food at the hot spot heats up dramatically when the emitter power is turned "ON", and then slowly falls while the emitter is "OFF". The temperature of the food at the cold spot is very slow to equilibrate.

Figure 2:
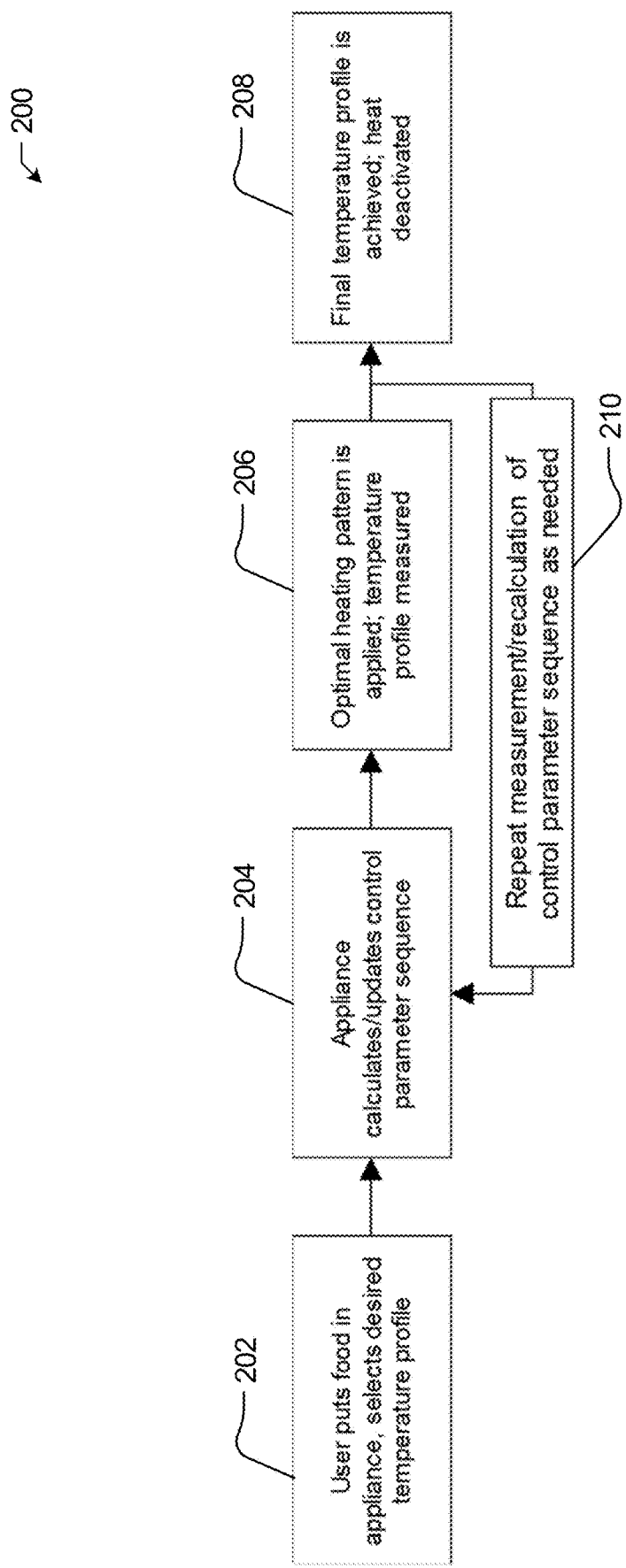
FIG. 2 illustrates an example workflow diagram for providing a temperature profile based microwave oven device.

FIG. 2 illustrates an example workflow diagram 200 for providing a temperature profile based microwave oven device. At block 202, a user puts food in the microwave oven device 102 and selects a desired temperature profile. At block 204, the microwave oven device 102 calculates and updates one or more control parameter sequences. At block 206, the microwave oven device 102 determines and applies an optimal heating pattern and the temperature profile is then measured. At block 208, the microwave oven device 102 may then achieve a final temperature profile and the microwave oven device 102 may be then deactivated. In particular embodiments, measuring where heat is being deposited in the food may be measured based on where microwave irradiation occurs or based on the electric-field pattern within the food.

Figure 3B:
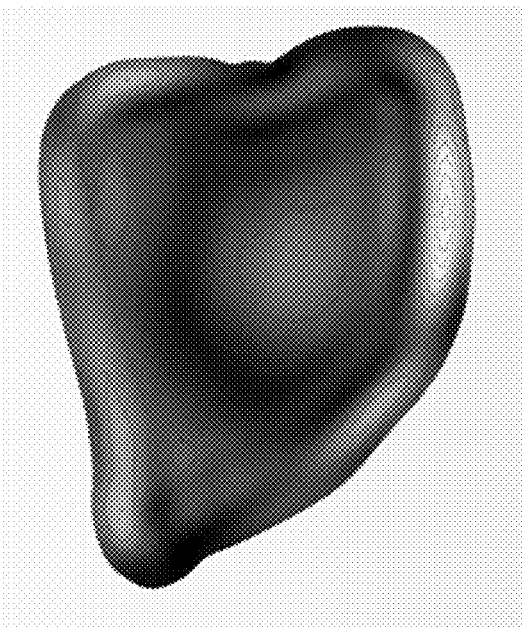
FIGS. 3A, 3B, 3C, and 3D illustrate one or more example experiential diagrams of a heating pattern.
Figure 3D:
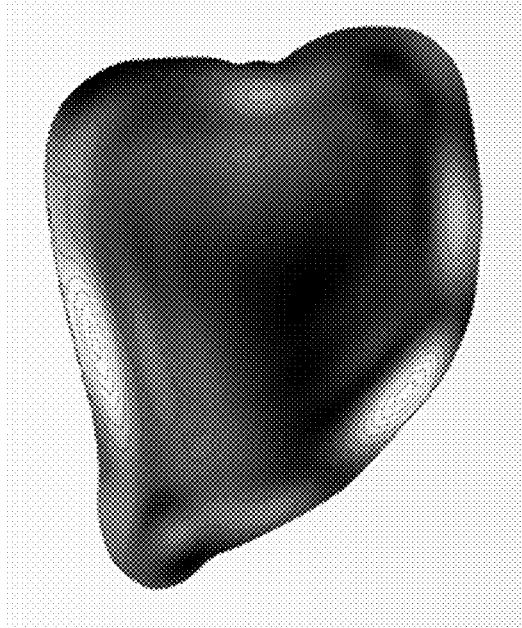
Figure 3A:
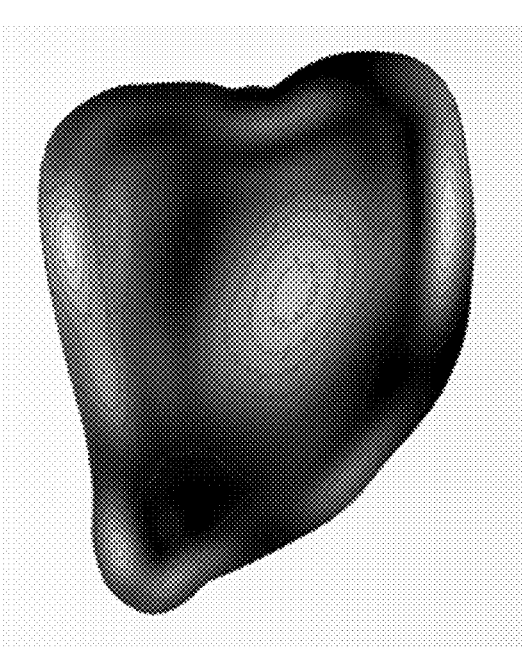
Figure 3C:
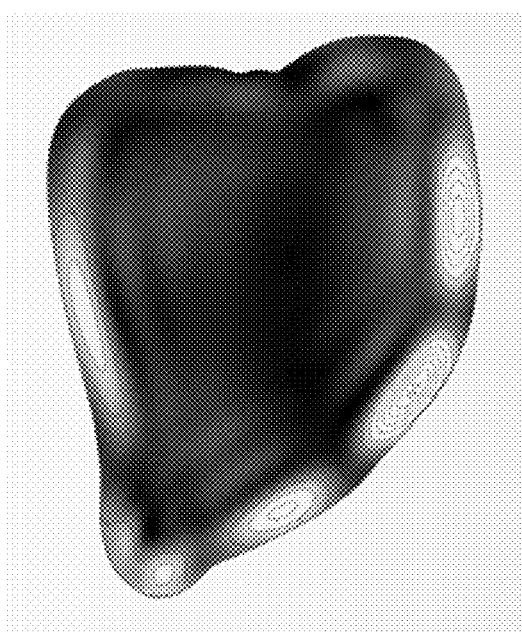

FIGS. 3A, 3B, 3C, and 3D illustrate one or more example experiential diagrams of a heating pattern, in accordance with the presently disclosed embodiments. For example, FIGS. 3A, 3B, 3C, and 3D illustrate that heating patterns within the food may be controlled either deterministically or non-deterministically through potential mechanisms such as, variation of the microwave emitter frequency, power, and in the case of multi-emitter systems, relative phase among emitters; rotation or translation of the food; modification of the cavity geometry or electrical properties; and addition of refracting or reflecting elements (including so-called "mode stirrers") within the microwave propagation path. For example, FIGS. 3A, 3B, 3C, and 3D depict simulated heating patterns in a beef steak with realistic dielectric and thermal properties when the steak is irradiated with microwave energy in a multimode cavity. The simulated cavity has two emitters operating at the same frequency that is chosen to be 2.45 GHz (FIGS. 3A and 3B) or 2.50 GHz (FIGS. 3C and 3D), with relative electromagnetic phase of 0° (FIGS. 3A and 3C) or 90° (FIGS. 3B and 3D). Heating rates are plotted on a range of 0 W/cm$^3$ to 2.5 W/cm$^3$. Variation of the other parameters listed above result in qualitatively similar variations in the resulting heating patterns.

Figure 4A:
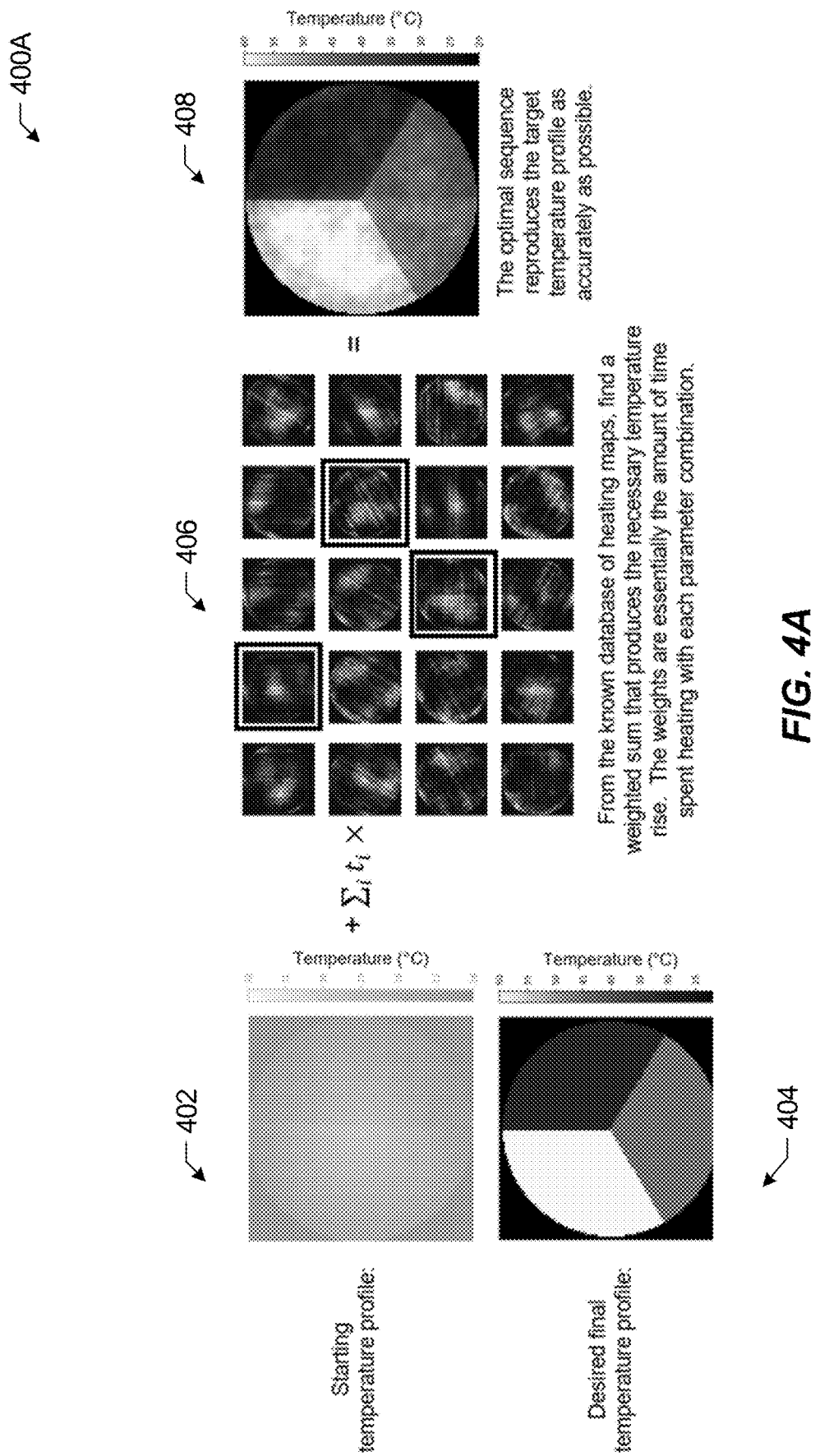
FIGS. 4A, 4B, and 4C illustrate one or more example diagrams depicting experimental and/or simulated data utilizing a temperature profile based microwave oven device.
Figures 4B, 4C:
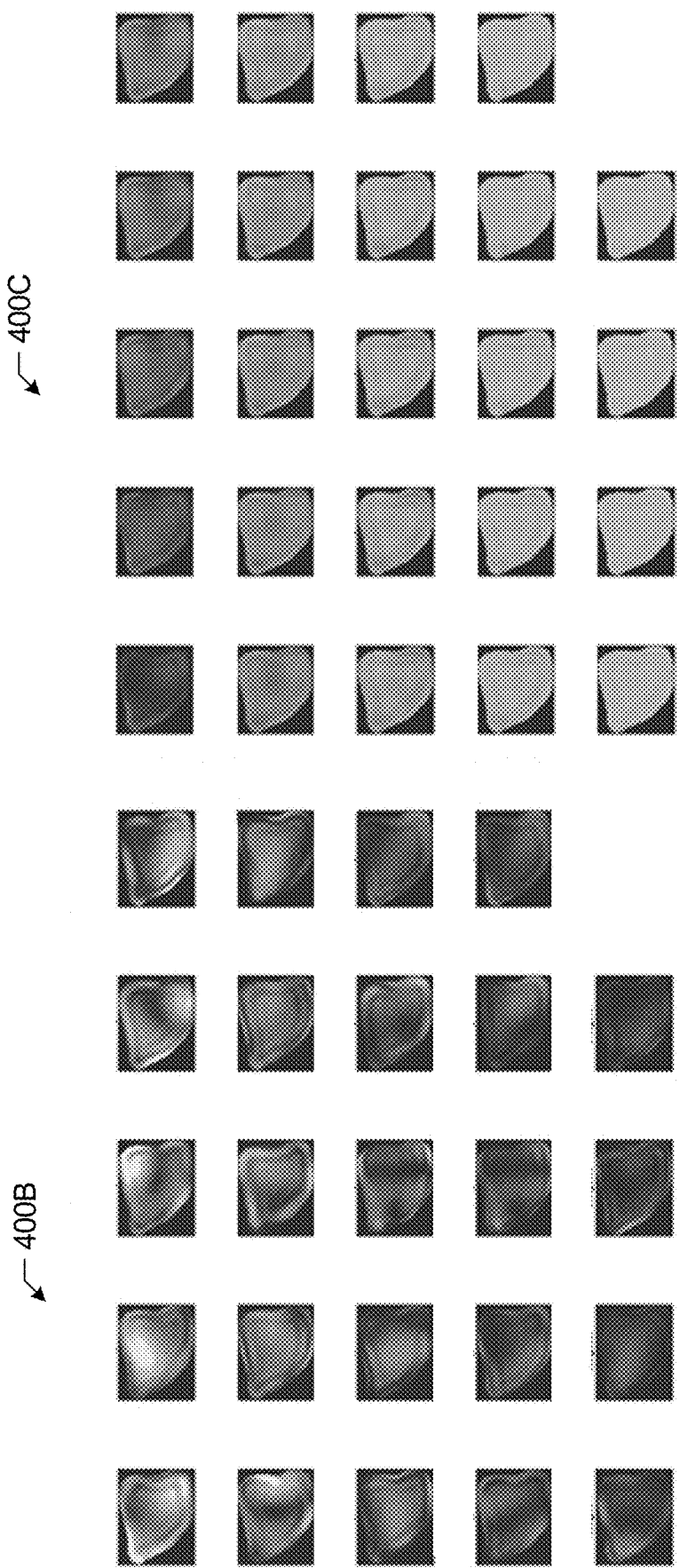

FIGS. 4A, 4B, and 4C illustrate one or more example diagrams 400A, 400B, and 400C, respectively, depicting experimental and/or simulated data utilizing a temperature profile based microwave oven device, in accordance with the presently disclosed embodiments. For example, in particular embodiments, FIGS. 4A, 4B, and 4C illustrate that once the set of achievable heating patterns has been predicted or measured, the microwave oven device 102 may then calculate the optimal sequence of control parameters that will yield heating patterns whose sum may achieve the target temperature profile. For example, referring to FIG. 4A, in particular embodiments, in order to achieve a desired final temperature profile 404 from the starting temperature profile 402, the microwave oven device 102 may generally impose a sequential series of distinct heating patterns 406, each arising from a different combination of control parameters. The net effect is the desired temperature rise, as illustrated by the optimum sequence and target temperature profile 408. This is encapsulated in the following equation. Choose optimal $t_i$ such that:

$$\Sigma_i t_i \Delta T(p_i) = (T_{desired} - T_{actual})$$ (Equation 7).

In Equation 7, $(T_{desired} - T_{actual})$ is the desired temperature rise map (essentially, a two-dimensional image), $\Delta T(p_i)$ are the temperature increase maps for given parameter combinations $p_i$, and $t_i$ are the times spent heating for each of those combinations. In particular embodiments, no single choice of control parameters may produce the desired temperature profile result, and thus the present embodiments include calculating the correct combination of heating patterns to direct to the food disposed inside the cavity of the microwave oven device 102 such that the cumulative temperature rise results in the desired temperature profile. In particular embodiments, since the microwave oven device 102 may only add heat and not take heat away, the heating times $t_i$ for the patterns used in the series may all be non-negative. Thus, if the individual heating patterns $\Delta T(p_i)$ are known for all possible permutations of control parameters, the non-negativity parameter may be solved by optimization, such as non-negative least squares (NNLS). In particular embodiments, constant or temperature-dependent cooling rates of the load may be measured or estimated, and the heating patterns can be corrected for cooling effects to yield better accuracy in the prediction of temperature rise. FIGS. 4B and 4C illustrate that, in many instances, the desired target temperature profile may be a homogeneous one. In the examples of FIGS. 4B and 4C, simulated microwave heating is performed on a beef steak for numerous combinations of control parameters. Each control parameter combination yields a different heating map, any one of which would over-heat some regions of the steak while under-heating others. Nevertheless, the optimal sequence of control parameters, implemented for the appropriate times, yields a final temperature that is much more homogeneous than could be achieved with one fixed set of control parameters.

FIGS. 5A, 5B, and 5C illustrate one or more example diagrams 500A, 500B, and 500C depicting techniques for providing a temperature profile based microwave oven device, in accordance with the presently disclosed embodiments. In particular embodiments, a two-step process may be implemented. For example, in particular embodiments, optional compression of the heating pattern data via an image decomposition algorithm such as nonnegative matrix factorization may be utilized as illustrated in FIG. 5A. This may serve to represent the set of potential heating patterns in a more compact subspace and speed computation. Subsequent calculation of a weighted series of heating patterns via a process such as, nonnegative least squares that best matches the heating profile may be utilized to achieve the target temperature map. For example, nonnegative matrix factorization (NNMF) may include an algorithm to deconstruct a set of images as a nonnegative combination of nonnegative basis images, and may be represented mathematically as:

$$\mathbb{X} = \mathbb{W} \times \mathbb{H}$$ (Equation 8).

In Equation 8, $\mathbb{X}$ is the reconstructed approximation of the original image set, $\mathbb{W}$ is a weighting matrix, and $\mathbb{H}$ is the set of basis images. Thus, FIG. 5A and Equation 8 may be utilized to generate heating maps for plausible food geometries and dielectric properties, in which NNMF may represent the full diversity of possible heating patterns within a very low-dimensional basis subspace. For example, FIG. 5B illustrates multiple heating maps of a three-portion food plate, which may include 121×121 pixels each, calculated for different microwave frequencies. In accordance with the presently disclosed techniques, FIG. 5C illustrates the same heating maps as FIG. 5B, except that the heating maps of FIG. 5C is reconstructed via NNMF in a lower-dimensional subspace.

Figure 6A:
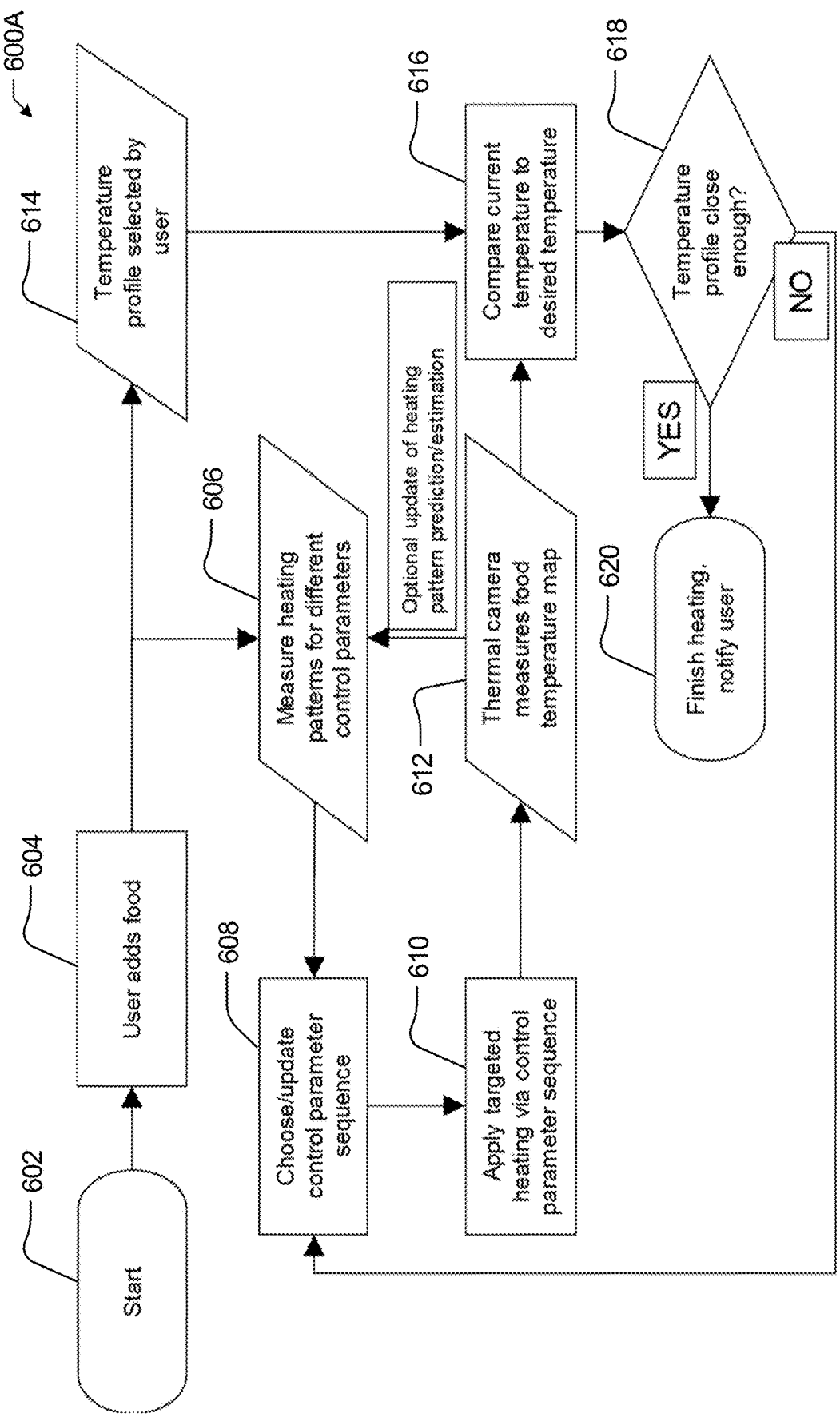
FIGS. 6A, 6B, 6C, 6D, 6E, and 6F illustrate example workflow diagrams for providing a temperature profile based microwave oven device.

FIGS. 6A, 6B, 6C, 6D, 6E and 6F illustrate example workflow diagrams for providing a temperature profile based microwave oven device, in accordance with the presently disclosed embodiments. FIG. 6A illustrates a first example workflow diagram 600A for providing a temperature profile based microwave oven device. The workflow diagram 600A may begin at block 602 with a user placing food into the microwave oven device 102 at block 604. At block 606, the microwave oven device 102 may then measure heating patterns for different control parameters, and concurrently or sequentially determine a temperature profile selected by a user at block 614. At block 608, the microwave oven device 102 selects or updates one or control parameter sequences. At block 610, the microwave oven device 102 applies targeted heating via the selected one or more control parameter sequences. At block 612, the microwave oven device 102 may then, in some embodiments, utilize a thermal camera to measure food temperature map. In particular embodiments, the microwave oven device 102 may provide optional update of heating pattern prediction and/or estimation as input to the block 606 at which the heating patterns for different control parameters are measured. At block 616, the microwave oven device 102 may then compare a current temperature of the food to the desired temperature profile. At block 618, the microwave oven device 102 may then determine whether the current temperature is close enough to the desired temperature profile and conclude with notifying the user at block 620.

Figure 6B:
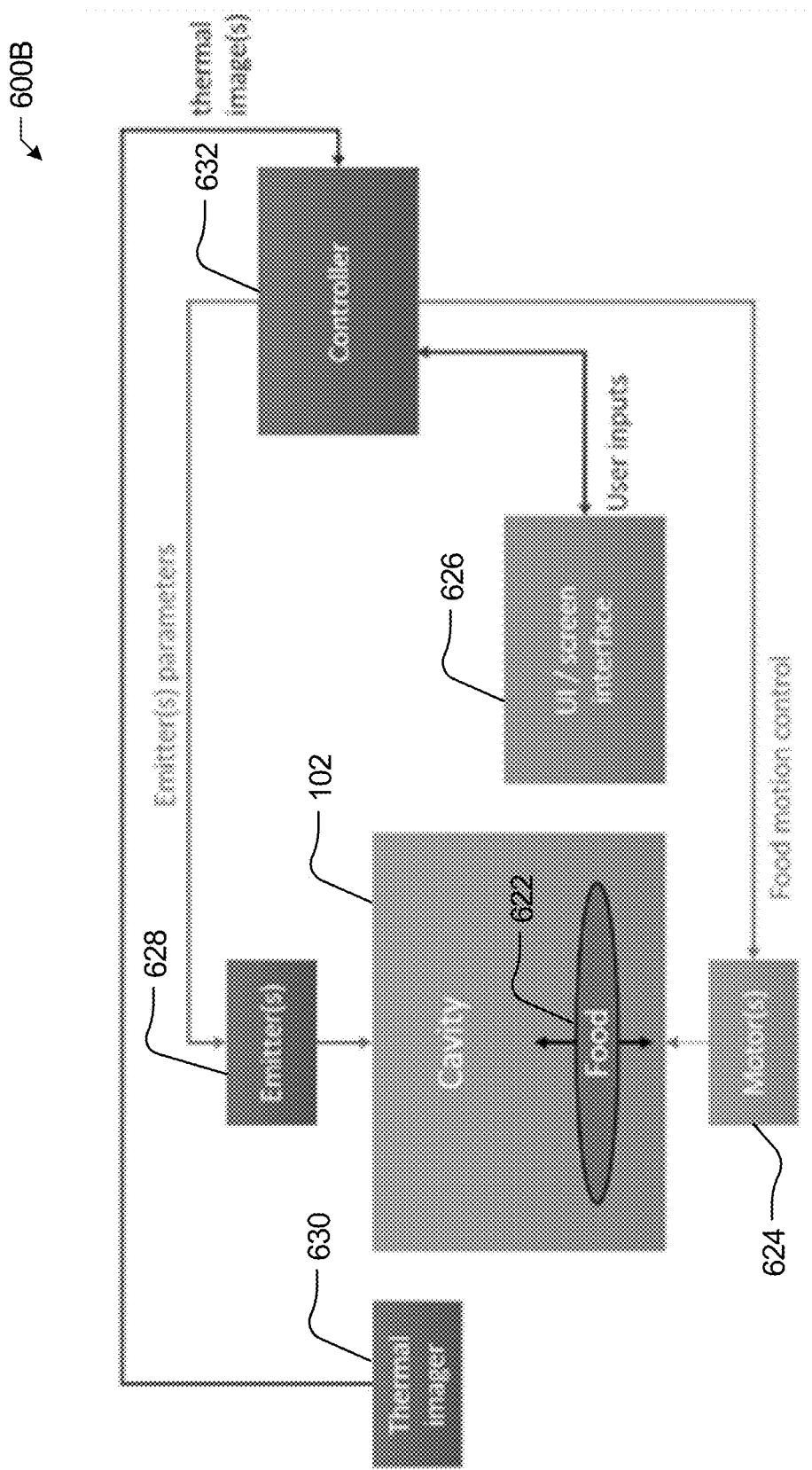

FIG. 6B illustrates an example system workflow diagram 600B for performing the workflow diagram 600A. As illustrated, food 622 is placed inside the microwave oven device 102 and its rotation angle and/or vertical position is controlled by one or more motors 624, operated deterministically by the controller 632. The user interface (UI) 626 displays information to the user, and allows the user to input a desired temperature result. One or more emitters 628 may be instructed by the controller 632 to direct microwave into the cavity of the microwave oven device 102. A thermal imaging device 630 (e.g., an infrared (IR) camera) images the food and measures its temperature profile. Based on these measurements, controller 632 calculates the proper sequence of control parameters to send to the one or more emitters 628 to steer the microwave heating pattern. The parameters of the one or more emitters 628 are varied in concert with food motion control to achieve desired combination of heating patterns.

Figure 6C:
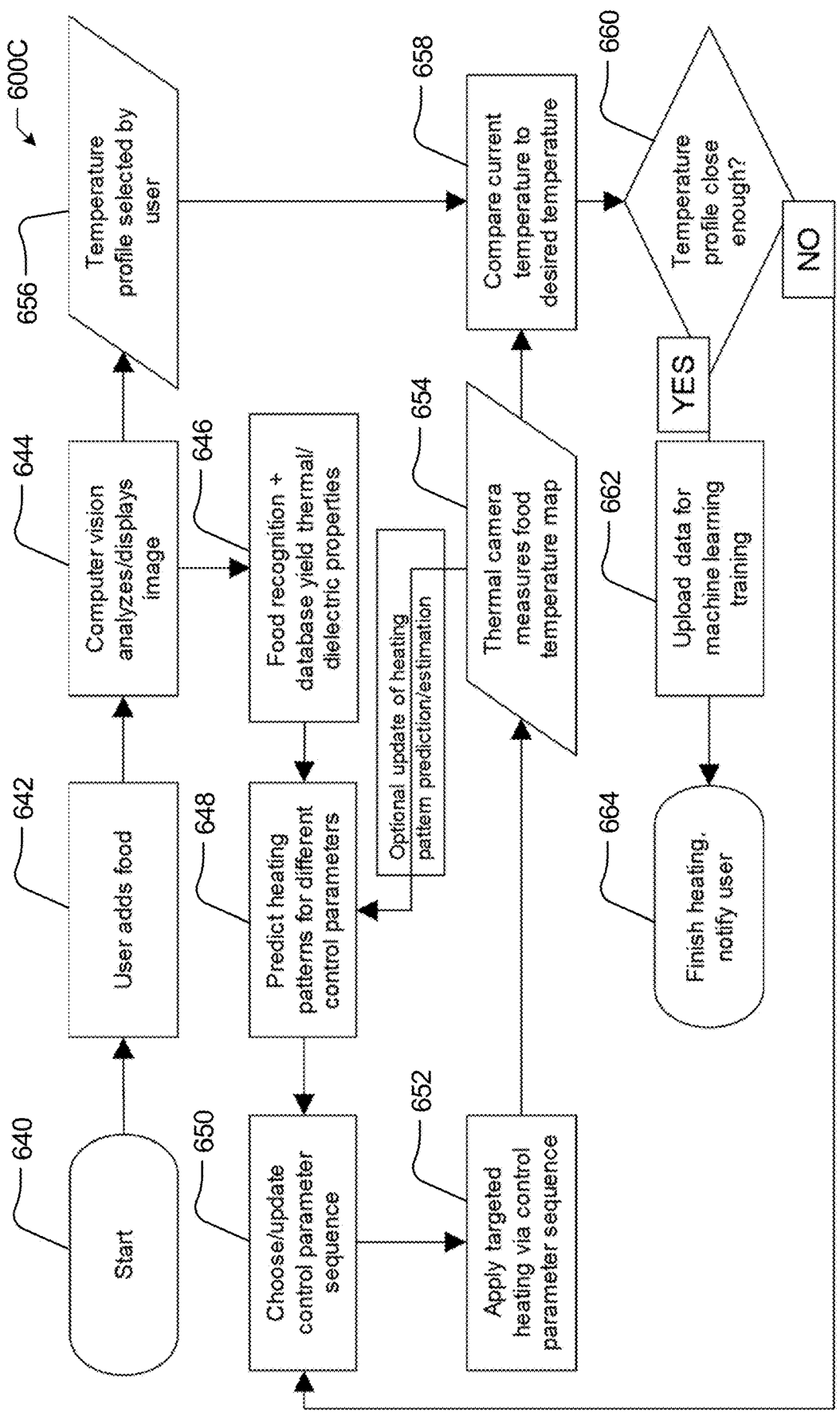

FIG. 6C illustrates a second example workflow diagram 600C for providing a temperature profile based microwave oven device. The workflow diagram 600C may begin at block 640 with a user placing food into the microwave oven device 102 at block 642. At block 644, the microwave oven device 102 may then utilize computer vision to analyze and display images. At block 646, the microwave oven device 102 performs food recognition and based on the identified food type consults a database to yield thermal and/or dielectric properties. Serially or in parallel, at block 656, the microwave oven device 102 may then determine a temperature profile selected by the user. At block 648, the microwave oven device 102 predict heating patterns for different control parameters. At block 650, the microwave oven device 102 may then select or update one or more control parameter sequences. At block 652, the microwave oven device 102 applies targeted heating via the one or more control parameter sequences. At block 654, the microwave oven device 102 may then, in some embodiments, utilize a thermal camera to measure food temperature map. At block 658, the microwave oven device 102 may then compare a current temperature of the food to the desired temperature profile. At block 660, the microwave oven device 102 may then determine whether the current temperature is close enough to the desired temperature profile and conclude with uploading the result for use for training a machine-learning model at block 662 and notifying the user at block 664.

Figure 6D:
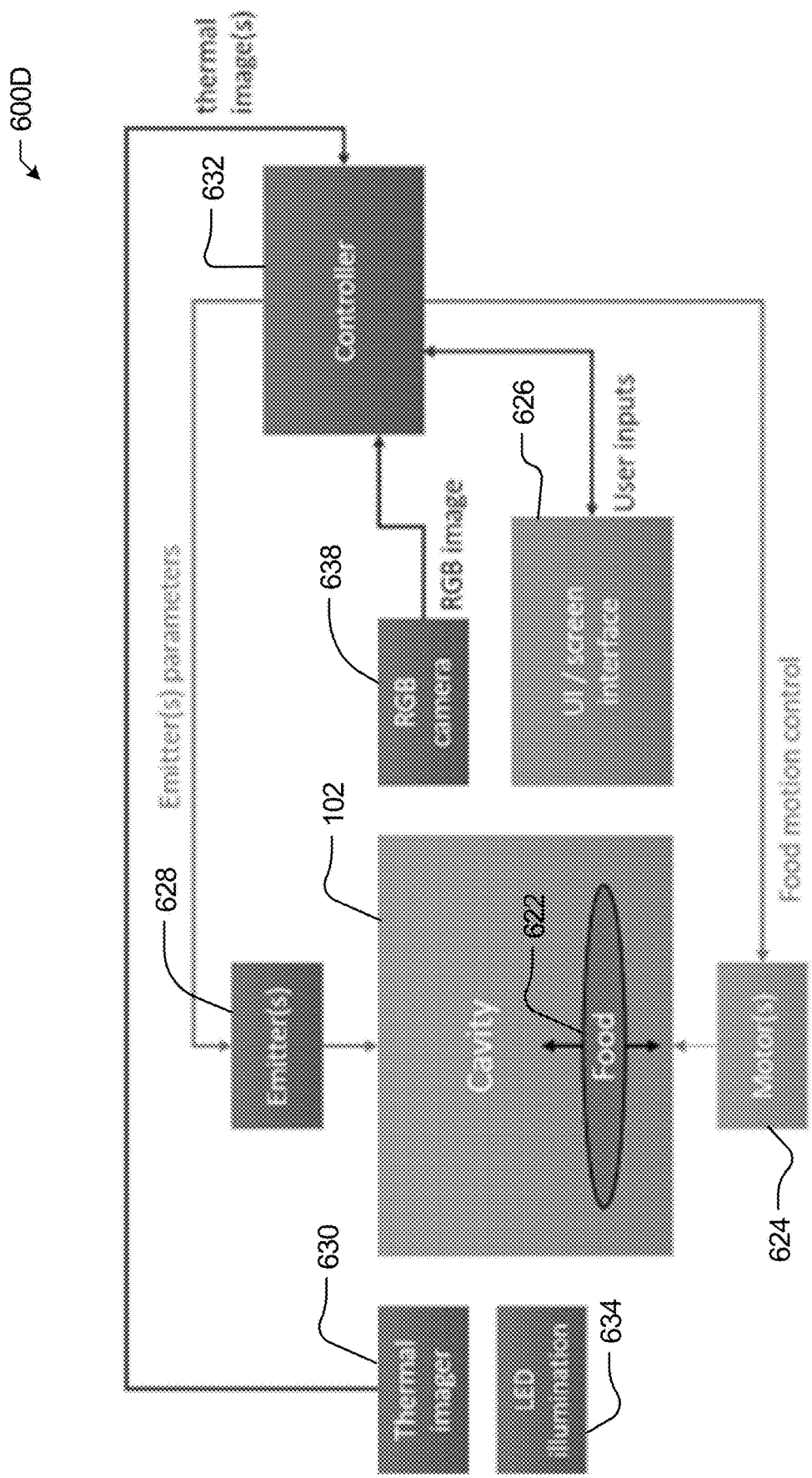

FIG. 6D illustrates an example system workflow diagram 600D for performing the workflow diagram 600C. As illustrated, food 622 is placed inside the microwave oven device 102 and its rotation angle and/or vertical position is controlled by one or more motors 624, which may be operated deterministically by the controller 632. Light-emitting diodes (LEDs) 634 may permit the visible light (e.g., RGB) camera 638 to image the food 622 for computer vision processing within the controller 632. The UI 626 displays information to the user, and allows the user to input a desired temperature result. The one or more emitters 628 may be instructed by the controller 632 to direct microwave energy into the cavity of the microwave oven device 102. The thermal imaging device 630 (e.g., IR camera) images the food 622 and measures its temperature profile. Based on these measurements, the controller 632 then calculates the proper sequence of control parameters to send to the one or more emitters 628 to steer the microwave heating pattern. In particular embodiments, parameters of the one or more emitters 628 may be varied in concert with food motion control to achieve desired combination of heating patterns. Lastly, data based on computer vision food 622 recognition may be transmitted along with final heating results to a database used for machine learning improvement of heating algorithms.

Figure 6E:
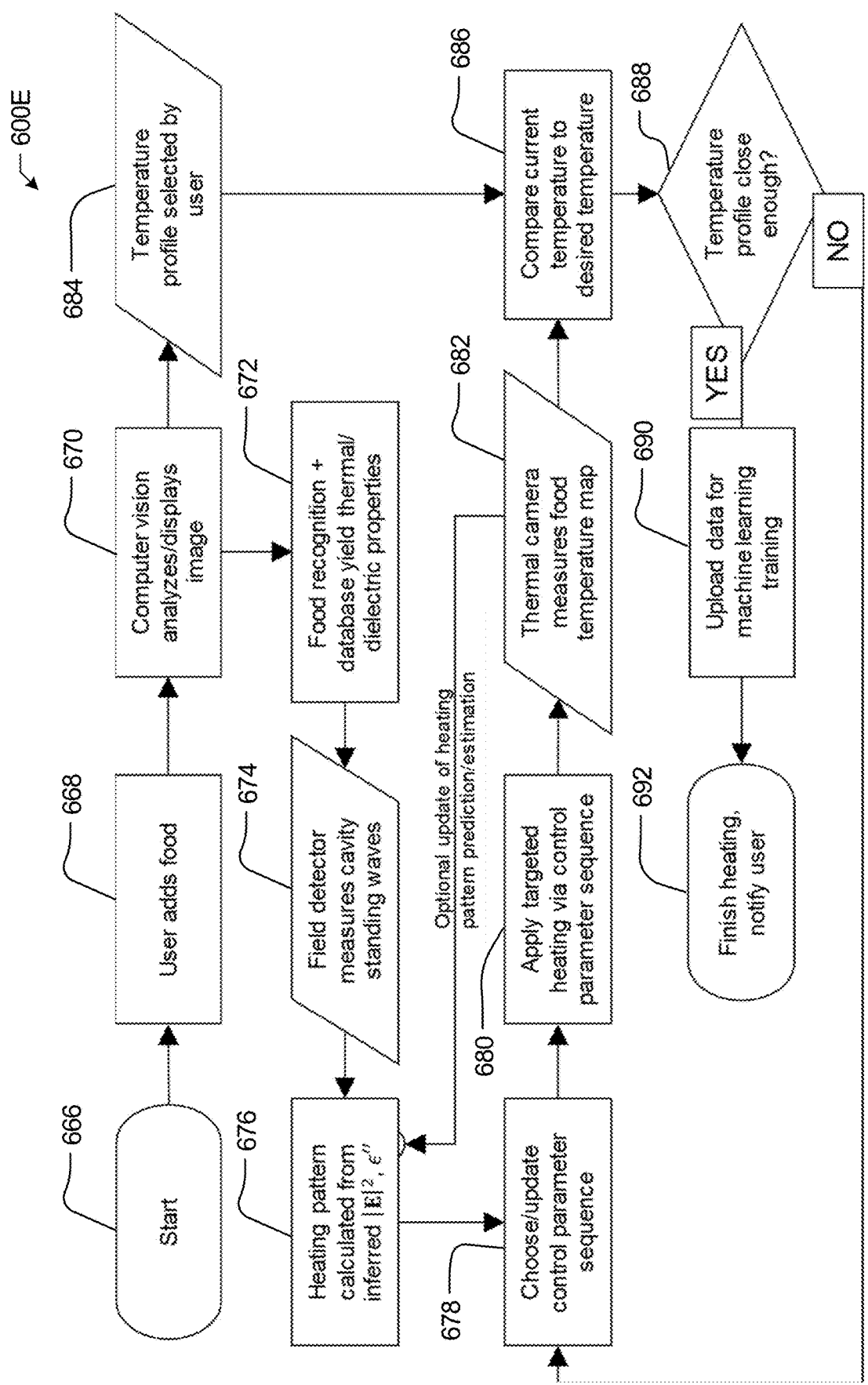

FIG. 6E illustrates a third example workflow diagram 600E for providing a temperature profile based microwave oven device. The workflow diagram 600E may begin at block 666 with a user placing food into the microwave oven device 102 at block 668. At block 670, the microwave oven device 102 may then utilize computer vision to analyze and display images. At block 672, the microwave oven device 102 performs food recognition and based on the identified food type consults a database to yield thermal and/or dielectric properties. Serially or in parallel, at block 684, the microwave oven device 102 may then determine a temperature profile selected by the user. At block 674, the microwave oven device 102 field detector measures a cavity standing wave pattern. At block 676, the microwave oven device 102 may then determine the heating pattern calculated from measurements or estimates of the microwave field $|E|^2$ and dielectric parameter $\epsilon''$ within the food. At block 678, the microwave oven device 102 may then select or update one or more control parameter sequences. At block 680, the microwave oven device 102 applies targeted heating via the one or more control parameter sequences. At block 682, the microwave oven device 102 may then, in some embodiments, utilize a thermal camera to measure food temperature map. At block 686, the microwave oven device 102 may then compare a current temperature of the food to the desired temperature profile. At block 688, the microwave oven device 102 may then determine whether the current temperature is close enough to the desired temperature profile and conclude with uploading the result for use for training a machine-learning model at block 690 and notifying the user at block 692.

Figure 6F:
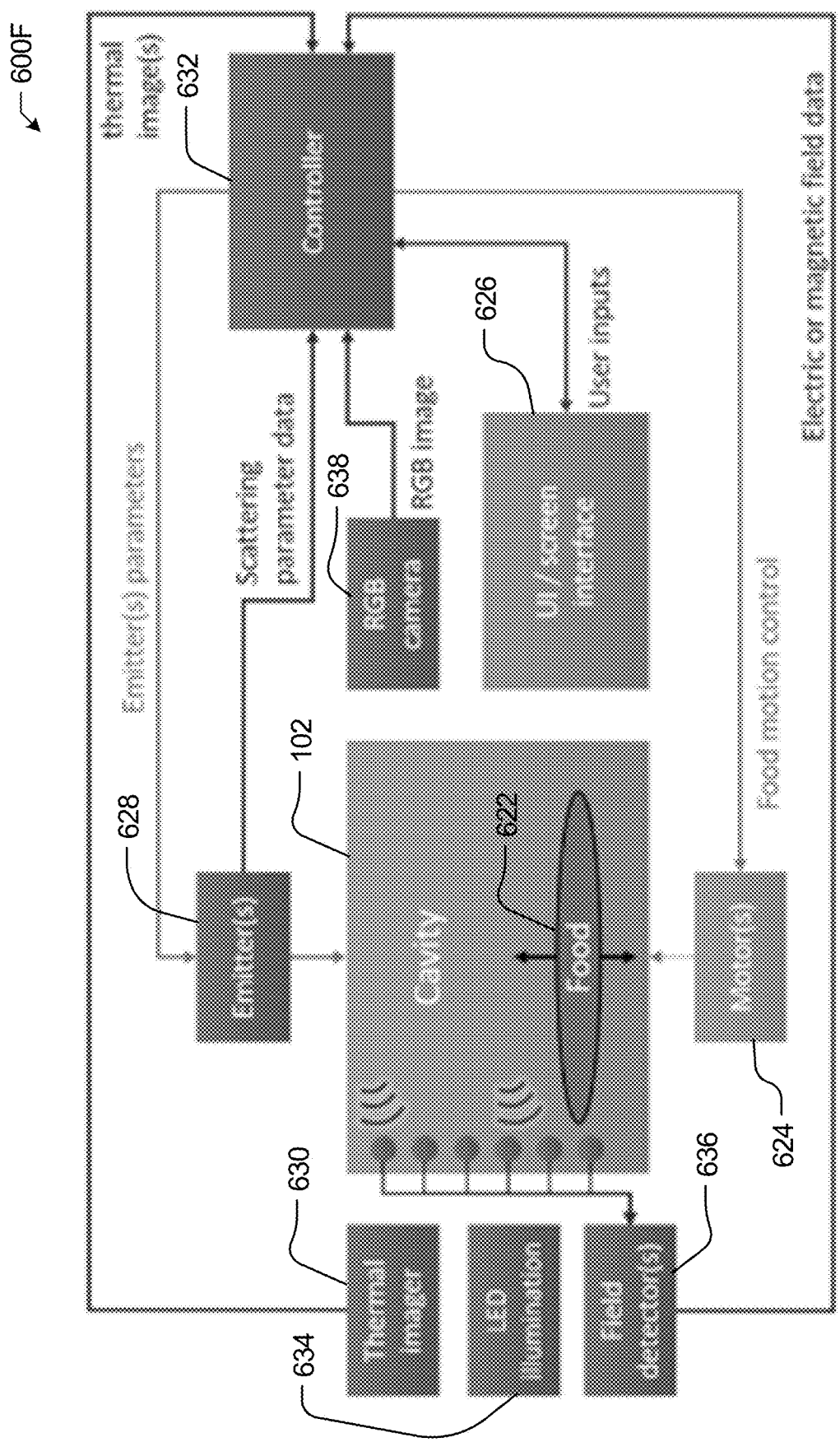

FIG. 6F illustrates an example system workflow diagram 600F for performing the workflow diagram 600E. As illustrated, the food 622 may be placed inside the microwave oven device 102 and its rotation angle and/or vertical position is controlled by one or more motors 624, which may be operated deterministically by the controller 632. Light-emitting diodes (LEDs) 634 may permit the visible light (e.g., RGB) camera 638 to image the food 622 for computer vision processing within the controller 632. The UI 626 displays information to the user, and allows the user to input a desired temperature result. The one or more emitters 628 may be instructed by the controller 632 to direct microwave energy into the cavity of the microwave oven device 102. Measurements of the field and/or scattering parameter data by the field detectors 636 are transmitted to the controller 632, which calculates the standing-wave pattern and the heating within the food 622. The thermal imager 630 may determine the current temperature of the food 622. The controller 632 may then calculate the proper sequence of control parameters to send to the one or more emitters 628 to steer the microwave heating pattern. Parameters of the one or more emitters 628 may be then varied in concert with food motion control to achieve desired combination of heating patterns. The results may be transmitted to a database and used for improvement of heating algorithms.

Figure 7:
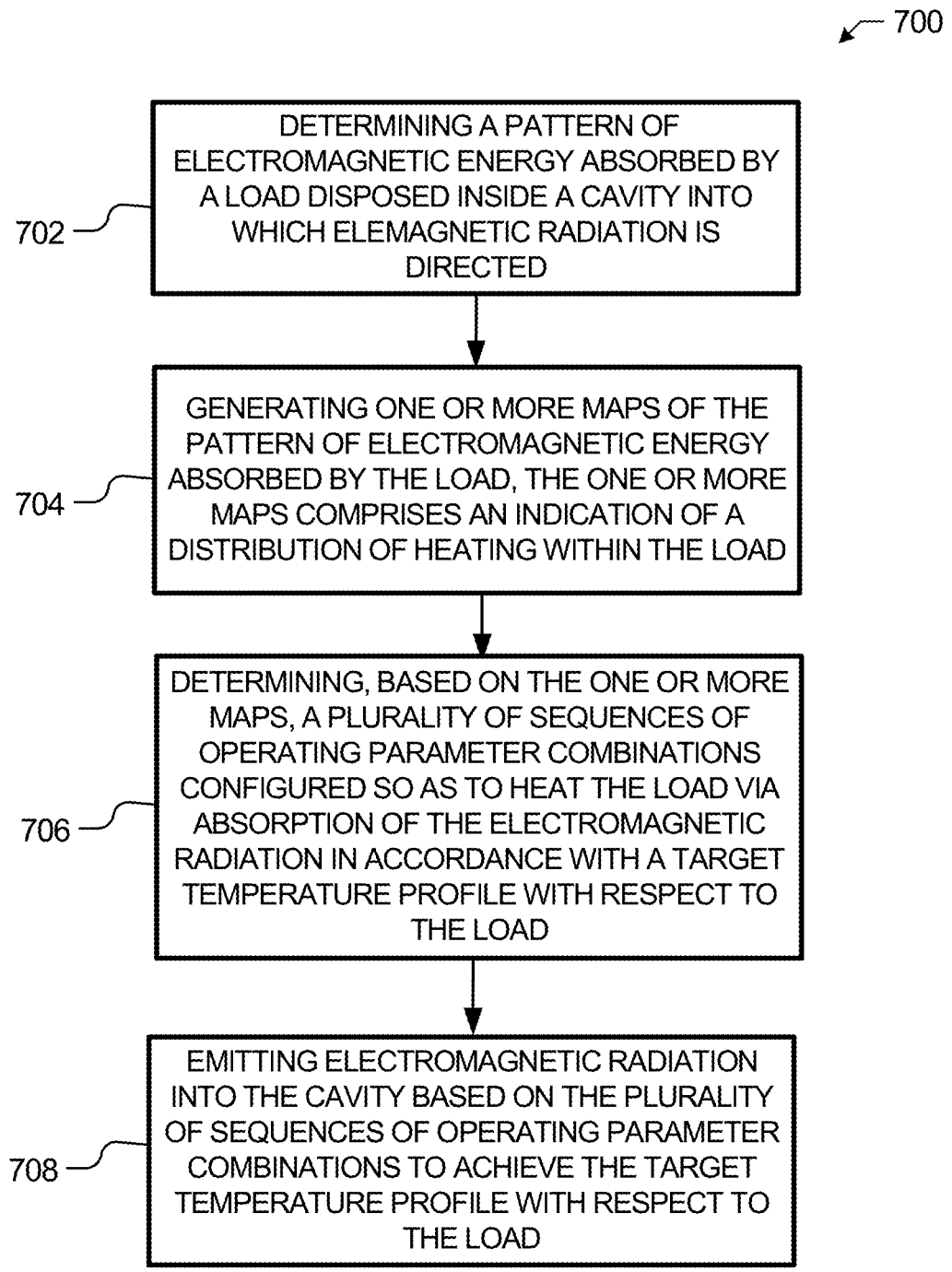
FIG. 7 illustrates is a flow diagram of a method for providing a temperature profile based microwave oven device.

FIG. 7 illustrates is a flow diagram of a method 700 for providing a temperature profile based microwave oven device, in accordance with the presently disclosed embodiments. The method 700 may be performed utilizing one or more processing devices (e.g., microwave oven device 102) that may include hardware (e.g., a general purpose processor, a graphic processing unit (GPU), an application-specific integrated circuit (ASIC), a system-on-chip (SoC), a microcontroller, a field-programmable gate array (FPGA), a central processing unit (CPU), an application processor (AP), a visual processing unit (VPU), a neural processing unit (NPU), a neural decision processor (NDP), or any other processing device(s) that may be suitable for processing image data), software (e.g., instructions running/executing on one or more processors), firmware (e.g., microcode), or some combination thereof.

The method 700 may begin block 702 with the one or more processing devices (e.g., microwave oven device 102) determining the pattern of electromagnetic energy absorbed by a load disposed inside a cavity of an electromagnetic device based on electromagnetic energy directed into the cavity. The method 700 may then continue at block 704 with the one or more processing devices (e.g., microwave oven device 102) generating one or more maps of the energy deposition of the load, wherein the one or more maps comprises an indication of a distribution of absorbed energy throughout the load. The method 700 may then continue at block 706 with the one or more processing devices (e.g., microwave oven device 102) determining, based on the one or more maps of the energy deposition, a plurality of sequences of operating parameter combinations configured to cause the electromagnetic device to heat the load via absorption of electromagnetic radiation in accordance with a target temperature profile with respect to the load. The method 700 may then conclude at block 708 with the one or more processing devices (e.g., microwave oven device 102) emitting electromagnetic radiation into the cavity based on the plurality of sequences of operating parameters to achieve the target temperature profile with respect to the load. In this way, the present embodiments may provide a temperature profile based microwave oven device that allows a user to input a desired temperature or desired temperature profile for their food as opposed to a time duration, and automatically apply the heating energy suitable to achieve the desired heating temperature without further user input.

Figure 8:
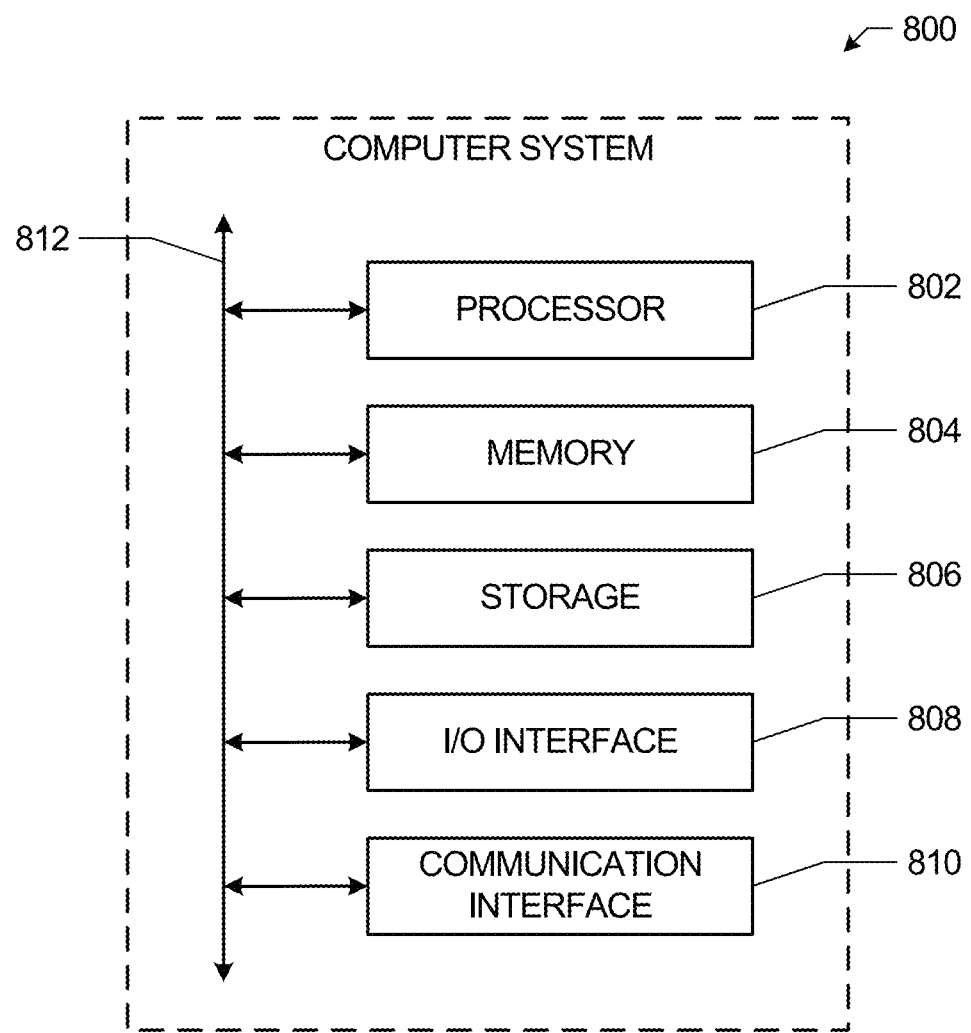
FIG. 8 illustrates an example computer system.

FIG. 8 illustrates an example computer system 800 that may be utilized for providing a temperature profile based microwave oven device, in accordance with the presently disclosed embodiments. In particular embodiments, one or more computer systems 800 perform one or more steps of one or more methods described or illustrated herein. In particular embodiments, one or more computer systems 800 provide functionality described or illustrated herein. In particular embodiments, software running on one or more computer systems 800 performs one or more steps of one or more methods described or illustrated herein or provides functionality described or illustrated herein. Particular embodiments include one or more portions of one or more computer systems 800. Herein, reference to a computer system may encompass a computing device, and vice versa, where appropriate. Moreover, reference to a computer system may encompass one or more computer systems, where appropriate.

This disclosure contemplates any suitable number of computer systems 800. This disclosure contemplates computer system 800 taking any suitable physical form. As example and not by way of limitation, computer system 800 may be an embedded computer system, a system-on-chip (SOC), a single-board computer system (SBC) (e.g., a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a server, a tablet computer system, an augmented/virtual reality device, or a combination of two or more of these. Where appropriate, computer system 800 may include one or more computer systems 800; be unitary or distributed; span multiple locations; span multiple machines; span multiple data centers; or reside in a cloud, which may include one or more cloud components in one or more networks.

Where appropriate, one or more computer systems 800 may perform without substantial spatial or temporal limitation one or more steps of one or more methods described or illustrated herein. As an example, and not by way of limitation, one or more computer systems 800 may perform in real time or in batch mode one or more steps of one or more methods described or illustrated herein. One or more computer systems 800 may perform at different times or at different locations one or more steps of one or more methods described or illustrated herein, where appropriate.

In particular embodiments, computer system 800 includes a processor 802, memory 804, storage 806, an input/output (I/O) interface 808, a communication interface 810, and a bus 812. Although this disclosure describes and illustrates a particular computer system having a particular number of particular components in a particular arrangement, this disclosure contemplates any suitable computer system having any suitable number of any suitable components in any suitable arrangement.

In particular embodiments, processor 802 includes hardware for executing instructions, such as those making up a computer program. As an example, and not by way of limitation, to execute instructions, processor 802 may retrieve (or fetch) the instructions from an internal register, an internal cache, memory 804, or storage 806; decode and execute them; and then write one or more results to an internal register, an internal cache, memory 804, or storage 806. In particular embodiments, processor 802 may include one or more internal caches for data, instructions, or addresses. This disclosure contemplates processor 802 including any suitable number of any suitable internal caches, where appropriate. As an example, and not by way of limitation, processor 802 may include one or more instruction caches, one or more data caches, and one or more translation lookaside buffers (TLBs). Instructions in the instruction caches may be copies of instructions in memory 804 or storage 806, and the instruction caches may speed up retrieval of those instructions by processor 802.

Data in the data caches may be copies of data in memory 804 or storage 806 for instructions executing at processor 802 to operate on; the results of previous instructions executed at processor 802 for access by subsequent instructions executing at processor 802 or for writing to memory 804 or storage 806; or other suitable data. The data caches may speed up read or write operations by processor 802. The TLBs may speed up virtual-address translation for processor 802. In particular embodiments, processor 802 may include one or more internal registers for data, instructions, or addresses. This disclosure contemplates processor 802 including any suitable number of any suitable internal registers, where appropriate. Where appropriate, processor 802 may include one or more arithmetic logic units (ALUs); be a multi-core processor; or include one or more processors 802. Although this disclosure describes and illustrates a particular processor, this disclosure contemplates any suitable processor.

In particular embodiments, memory 804 includes main memory for storing instructions for processor 802 to execute or data for processor 802 to operate on. As an example, and not by way of limitation, computer system 800 may load instructions from storage 806 or another source (such as, for example, another computer system 800) to memory 804. Processor 802 may then load the instructions from memory 804 to an internal register or internal cache. To execute the instructions, processor 802 may retrieve the instructions from the internal register or internal cache and decode them. During or after execution of the instructions, processor 802 may write one or more results (which may be intermediate or final results) to the internal register or internal cache. Processor 802 may then write one or more of those results to memory 804. In particular embodiments, processor 802 executes only instructions in one or more internal registers or internal caches or in memory 804 (as opposed to storage 806 or elsewhere) and operates only on data in one or more internal registers or internal caches or in memory 804 (as opposed to storage 806 or elsewhere).

One or more memory buses (which may each include an address bus and a data bus) may couple processor 802 to memory 804. Bus 812 may include one or more memory buses, as described below. In particular embodiments, one or more memory management units (MMUs) reside between processor 802 and memory 804 and facilitate accesses to memory 804 requested by processor 802. In particular embodiments, memory 804 includes random access memory (RAM). This RAM may be volatile memory, where appropriate. Where appropriate, this RAM may be dynamic RAM (DRAM) or static RAM (SRAM). Moreover, where appropriate, this RAM may be single-ported or multi-ported RAM. This disclosure contemplates any suitable RAM. Memory 804 may include one or more memories 804, where appropriate. Although this disclosure describes and illustrates particular memory, this disclosure contemplates any suitable memory.

In particular embodiments, storage 806 includes mass storage for data or instructions. As an example, and not by way of limitation, storage 806 may include a hard disk drive (HDD), a floppy disk drive, flash memory, an optical disc, a magneto-optical disc, magnetic tape, or a Universal Serial Bus (USB) drive or a combination of two or more of these. Storage 806 may include removable or non-removable (or fixed) media, where appropriate. Storage 806 may be internal or external to computer system 800, where appropriate. In particular embodiments, storage 806 is non-volatile, solid-state memory. In particular embodiments, storage 806 includes read-only memory (ROM). Where appropriate, this ROM may be mask-programmed ROM, programmable ROM (PROM), erasable PROM (EPROM), electrically erasable PROM (EEPROM), electrically alterable ROM (EAROM), or flash memory or a combination of two or more of these. This disclosure contemplates mass storage 806 taking any suitable physical form. Storage 806 may include one or more storage control units facilitating communication between processor 802 and storage 806, where appropriate. Where appropriate, storage 806 may include one or more storages 806. Although this disclosure describes and illustrates particular storage, this disclosure contemplates any suitable storage.

In particular embodiments, I/O interface 808 includes hardware, software, or both, providing one or more interfaces for communication between computer system 800 and one or more I/O devices. Computer system 800 may include one or more of these I/O devices, where appropriate. One or more of these I/O devices may enable communication between a person and computer system 800. As an example, and not by way of limitation, an I/O device may include a keyboard, keypad, microphone, monitor, mouse, printer, scanner, speaker, still camera, stylus, tablet, touch screen, trackball, video camera, another suitable I/O device or a combination of two or more of these. An I/O device may include one or more sensors. This disclosure contemplates any suitable I/O devices and any suitable I/O interfaces 806 for them. Where appropriate, I/O interface 808 may include one or more device or software drivers enabling processor 802 to drive one or more of these I/O devices. I/O interface 808 may include one or more I/O interfaces 806, where appropriate. Although this disclosure describes and illustrates a particular I/O interface, this disclosure contemplates any suitable I/O interface.

In particular embodiments, communication interface 810 includes hardware, software, or both providing one or more interfaces for communication (such as, for example, packet-based communication) between computer system 800 and one or more other computer systems 800 or one or more networks. As an example, and not by way of limitation, communication interface 810 may include a network interface controller (NIC) or network adapter for communicating with an Ethernet or other wire-based network or a wireless NIC (WNIC) or wireless adapter for communicating with a wireless network, such as a WI-FI network. This disclosure contemplates any suitable network and any suitable communication interface 810 for it.

As an example, and not by way of limitation, computer system 800 may communicate with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, computer system 800 may communicate with a wireless PAN (WPAN) (such as, for example, a BLUETOOTH WPAN), a WI-FI network, a WI-MAX network, a cellular telephone network (such as, for example, a Global System for Mobile Communications (GSM) network), or other suitable wireless network or a combination of two or more of these. Computer system 800 may include any suitable communication interface 810 for any of these networks, where appropriate. Communication interface 810 may include one or more communication interfaces 810, where appropriate. Although this disclosure describes and illustrates a particular communication interface, this disclosure contemplates any suitable communication interface.

In particular embodiments, bus 812 includes hardware, software, or both coupling components of computer system 800 to each other. As an example, and not by way of limitation, bus 812 may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCIe) bus, a serial advanced technology attachment (SATA) bus, a Video Electronics Standards Association local (VLB) bus, or another suitable bus or a combination of two or more of these. Bus 812 may include one or more buses 812, where appropriate. Although this disclosure describes and illustrates a particular bus, this disclosure contemplates any suitable bus or interconnect.

Herein, a computer-readable non-transitory storage medium or media may include one or more semiconductor-based or other integrated circuits (ICs) (such, as for example, field-programmable gate arrays (FPGAs) or application-specific ICs (ASICs)), hard disk drives (HDDs), hybrid hard drives (HHDs), optical discs, optical disc drives (ODDs), magneto-optical discs, magneto-optical drives, floppy diskettes, floppy disk drives (FDDs), magnetic tapes, solid-state drives (SSDs), RAM-drives, SECURE DIGITAL cards or drives, any other suitable computer-readable non-transitory storage media, or any suitable combination of two or more of these, where appropriate. A computer-readable non-transitory storage medium may be volatile, non-volatile, or a combination of volatile and non-volatile, where appropriate.

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

Herein, "automatically" and its derivatives means "without human intervention," unless expressly indicated otherwise or indicated otherwise by context.

The embodiments disclosed herein are only examples, and the scope of this disclosure is not limited to them. Embodiments according to the invention are in particular disclosed in the attached claims directed to a method, a storage medium, a system and a computer program product, wherein any feature mentioned in one claim category, e.g. method, may be claimed in another claim category, e.g. system, as well. The dependencies or references back in the attached claims are chosen for formal reasons only. However, any subject matter resulting from a deliberate reference back to any previous claims (in particular multiple dependencies) may be claimed as well, so that any combination of claims and the features thereof are disclosed and may be claimed regardless of the dependencies chosen in the attached claims. The subject-matter which may be claimed comprises not only the combinations of features as set out in the attached claims but also any other combination of features in the claims, wherein each feature mentioned in the claims may be combined with any other feature or combination of other features in the claims. Furthermore, any of the embodiments and features described or depicted herein may be claimed in a separate claim and/or in any combination with any embodiment or feature described or depicted herein or with any of the features of the attached claims.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes and illustrates respective embodiments herein as including particular components, elements, feature, functions, operations, or steps, any of these embodiments may include any combination or permutation of any of the components, elements, features, functions, operations, or steps described or illustrated anywhere herein that a person having ordinary skill in the art would comprehend. Furthermore, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative. Additionally, although this disclosure describes or illustrates particular embodiments as providing particular advantages, particular embodiments may provide none, some, or all of these advantages.

What is claimed is:

1. A method comprising, by an electromagnetic device comprising one or more processors and configured to emit electromagnetic radiation into a cavity of the electromagnetic device:
    determining, for a load disposed inside the cavity of the electromagnetic device and for each of a plurality of different combinations of variable operating parameters of the electromagnetic device that control heating by the electromagnetic device, a heating map identifying a heating pattern that the load will experience when the electromagnetic device is operated according to that respective combination of variable operating parameters for a particular amount of time;
    determining a current temperature profile of the load;
    determining a target temperature profile of the load;
    determining, based on (1) a plurality of the heating maps (2) the current temperature profile and (3) the target temperature profile:
        (1) a sequential series of heating patterns to use to heat the load, each heating pattern in the sequential series corresponding to a different combination of variable operating parameters of the electromagnetic device;
        (2) for each combination of variable operating parameters in the sequential series, a corresponding amount of time at which to operate the electromagnetic device according to that particular combination of variable operating parameters, wherein the sequential series of heating patterns and the corresponding amounts of time are determined prior to heating the load based on the sequential series; and emitting electromagnetic radiation into the cavity based on the sequential series of combinations of variable operating parameters to achieve the target temperature profile with respect to the load.

2. The method of claim 1, further comprising:
determining a type of the load, wherein determining the heating map identifying the heating pattern that the load experiences is based on the type of the load.

3. The method of claim 1, wherein the variable operating parameters comprise one or more of a radiation frequency, a radiation amplitude, a radiation phase, a radiation phase shift, an orientation of electromagnetically reflecting or refracting elements within the cavity, a load rotation, or a load translation.

4. The method of claim 1, wherein the sequential series of heating patterns to use to heat the load is determined based on a weighted sum of different combinations of variable operating parameters.

5. The method of claim 4, wherein each combination of variable operating parameters in the weighted sum is weighted by the respective corresponding amount of time.

6. The method of claim 1, wherein emitting the electromagnetic radiation into the cavity comprises emitting electromagnetic radiation to heat the load in accordance with the target temperature profile.

7. The method of claim 1, wherein emitting the electromagnetic radiation into the cavity comprises varying the plurality of different combinations of variable operating parameters and a motion of the load concurrently.

8. An electromagnetic device comprising:
one or more emitters;
a cavity;
one or more non-transitory computer-readable storage media including instructions; and one or more processors coupled to the one or more emitters and the one or more storage media, the one or more processors configured to execute the instructions to:
determine, for a load disposed inside the cavity of the electromagnetic device and for each of a plurality of different combinations of variable operating parameters of the electromagnetic device that control heating by the electromagnetic device, a heating map identifying a heating pattern that the load will experience when the electromagnetic device is operated according to that respective combination of variable operating parameters for a particular amount of time;
determine a current temperature profile of the load;
determine a target temperature profile of the load;
determine, based on (1) a plurality of the heating maps (2) the current temperature profile and (3) the target temperature profile:
(1) a sequential series of heating patterns to use to heat the load, each heating pattern in the sequential series corresponding to a different combination of variable operating parameters of the electromagnetic device;
(2) for each combination of variable operating parameters in the sequential series, a corresponding amount of time at which to operate the electromagnetic device according to that particular combination of variable operating parameters, wherein the sequential series of heating patterns and the corresponding amounts of time are determined prior to heating the load based on the sequential series; and
cause the one or more emitters to emit electromagnetic radiation into the cavity based on the sequential series of combinations of variable operating parameters to achieve the target temperature profile with respect to the load.

9. The electromagnetic device of claim 8, wherein the instructions further comprises instructions to:
determine a type of the load, wherein determining the heating map identifying the heating pattern that the load experiences is based on the type of the load.

10. The electromagnetic device of claim 8, wherein the variable operating parameters comprise one or more of a radiation frequency, a radiation amplitude, a radiation phase, a radiation phase shift, an orientation of electromagnetically reflecting or refracting elements within the cavity, a load rotation, or a load translation.

11. The electromagnetic device of claim 8, wherein the sequential series of heating patterns to use to heat the load is determined based on a weighted sum of different combinations of variable operating parameters.

12. The electromagnetic device of claim 11, wherein each combination of variable operating parameters in the weighted sum is weighted by the respective corresponding amount of time.

13. The electromagnetic device of claim 8, wherein the instructions to emit the electromagnetic radiation into the cavity further comprises instructions to emit electromagnetic radiation to heat the load in accordance with the target temperature profile.

14. The electromagnetic device of claim 8, wherein the instructions to emit the electromagnetic radiation into the cavity further comprises instructions to vary the plurality of different combinations of variable operating parameters and a motion of the load concurrently.

15. A non-transitory computer-readable medium comprising instructions that, when executed by one or more processors of an electromagnetic device, cause the one or more processors to:
determine, for a load disposed inside a cavity of the electromagnetic device and for each of a plurality of different combinations of variable operating parameters of the electromagnetic device that control heating by the electromagnetic device, a heating map identifying a heating pattern that the load will experience when the electromagnetic device is operated according to that respective combination of variable operating parameters for a particular amount of time;
determine a current temperature profile of the load;
determine a target temperature profile of the load;
determine, based on (1) a plurality of the heating maps (2) the current temperature profile and (3) the target temperature profile:
(1) a sequential series of heating patterns to use to heat the load, each heating pattern in the sequential series corresponding to a different combination of variable operating parameters of the electromagnetic device;
(2) for each combination of variable operating parameters in the sequential series, a corresponding amount of time at which to operate the electromagnetic device according to that particular combination of variable operating parameters, wherein the sequential series of heating patterns and the corresponding amounts of time are determined prior to heating the load based on the sequential series; and
cause one or more emitters to emit electromagnetic radiation into the cavity based on the sequential series of combinations of variable operating parameters to achieve the target temperature profile with respect to the load.

16. The non-transitory computer-readable medium of claim 15, wherein the instructions further comprises instructions to:
   determine a type of the load, wherein determining the heating map identifying the heating pattern that the load experiences is based on the type of the load.

17. The non-transitory computer-readable medium of claim 15, wherein the variable operating parameters comprise one or more of a radiation frequency, a radiation amplitude, a radiation phase, a radiation phase shift, an orientation of electromagnetically reflecting or refracting elements within the cavity, a load rotation, or a load translation.

18. The non-transitory computer-readable medium of claim 15, wherein the sequential series of heating patterns to use to heat the load is determined based on a weighted sum of different combinations of variable operating parameters.

19. The non-transitory computer-readable medium of claim 18, wherein each combination of variable operating parameters in the weighted sum is weighted by the respective corresponding amount of time.

20. The non-transitory computer-readable medium of claim 15, wherein the instructions to emit the electromagnetic radiation into the cavity further comprises instructions to emit electromagnetic radiation to heat the load in accordance with the target temperature profile.

* * * * *